United States Patent [19]

Baur et al.

[11] 4,264,147
[45] Apr. 28, 1981

[54] INDICATOR DEVICE HAVING ELECTRO-OPTICAL LIGHT VALVE UNIT

[75] Inventors: Guenther Baur, Freiburg; Hans Krueger, Munich; Fritz Windscheid; Volker Wittwer, both of Freiburg, all of Fed. Rep. of Germany

[73] Assignee: Siemens Aktiengesellschaft, Berlin & Munich, Fed. Rep. of Germany

[21] Appl. No.: 55,343

[22] Filed: Jul. 6, 1979

[30] Foreign Application Priority Data

Aug. 11, 1978 [DE] Fed. Rep. of Germany ....... 2835347

[51] Int. Cl.³ .............................................. G02F 1/133
[52] U.S. Cl. .................................. 350/345; 350/334; 350/339 D; 350/339 F; 350/338
[58] Field of Search ................. 350/345, 339 F, 334, 350/339 D, 338

[56] References Cited

U.S. PATENT DOCUMENTS

| | | | |
|---|---|---|---|
| 4,111,534 | 9/1978 | Cirkler et al. | 350/345 |
| 4,113,360 | 9/1978 | Baur et al. | 350/285 |
| 4,142,781 | 3/1979 | Baur et al. | 350/345 |

*Primary Examiner*—Edward S. Bauer
*Attorney, Agent, or Firm*—Hill, Van Santen, Steadman, Chiara & Simpson

[57] ABSTRACT

An indicating device having an electro-optical light valve unit such as in a liquid crystal cell arranged behind a plate containing fluorescent particles characterized by a contrast filter disposed behind the plate and unit in the direction of viewing and a reflector disposed behind the contrast filter. The contrast filter will pass light of the spectrum which excites the fluorescent particles of the fluorescent plate but absorbs the emitted fluorescent light and a majority of the other light so that a background is either dark or of a specific color. The energized light valves cause a bright image on the dark or colored background.

21 Claims, 1 Drawing Figure

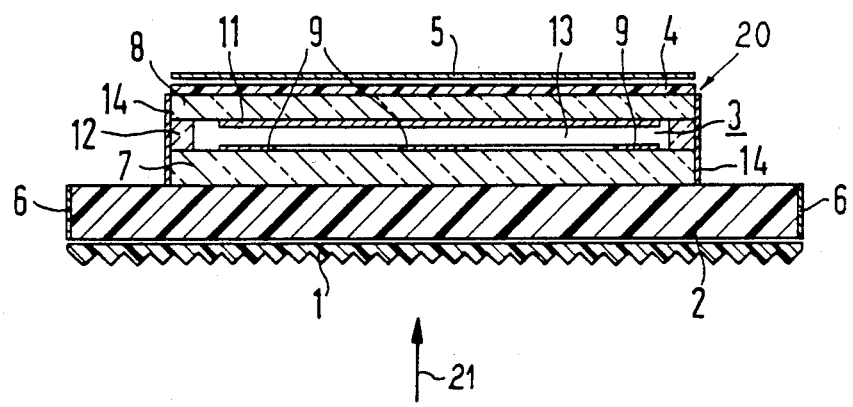

INDICATOR DEVICE HAVING ELECTRO-OPTICAL LIGHT VALVE UNIT

BACKGROUND OF THE INVENTION

The present invention is directed to an indicating device, which utilizes a light valve unit such as the liquid crystal cell in conjunction with a fluorescent plate and has a contrast filter and reflector arranged behind the unit and plate when taken in a direction of viewing.

A fluorescent activated display, which is referred to as a FLAD and utilizes an electro-optical light valve unit such as a liquid crystal cell in conjunction with a plate containing fluorescent particles, is known and examples are disclosed in German OS No. 26 16 669, whose disclosure was included in the U.S. Pat. No. 4,142,781 and also disclosed in German OS No. 26 19 352 on which U.S. Pat. No. 4,111,534 is based.

One version of a FLAD may have the light valve unit optically integrated with the fluorescent body so that it becomes a part of the light trap formed by the fluorescent body. A second version of a FLAD has the light valve unit and fluorescent part or plate spaced or separated without the optical coupling. A version with the optical coupling between the fluorescent plate and the light valve unit has several advantages over the version without the coupling. These advantages are that the fluorescent body does not require any special exit windows for decoupling light, polarizers can be eliminated, the fluorescent light may be decoupled from the body in those areas that are selected, and the excitation plate can be captured over a larger surface area. Despite these favorable conditions, the previously obtained representation quality still left something to be desired. For example, when only the front side of the display was available as a collector surface, the image contrast was still quite weak. An additional problem is that the diffused light, which is given off by the display, is often distributed over too large of a solid angle range and thereby reduces the contrast even more.

SUMMARY OF THE INVENTION

The present invention is directed to a design for a FLAD with an electro-optical light valve unit being optically coupled to the fluorescent plate for use in the reflection mode which display has a sufficient representation contrast. To accomplish these tasks, the invention is directed to an improvement in an indicating device having electro-optical light valve unit in optical contact with the fluorescent plate, said plate consisting of a material with the refraction of index larger than one and containing fluorescent particles creating a fluorescent light from an excitation spectrum of a given range of wavelengths of ambient light, said fluorescent plate being provided on its edges with means for reflecting light. The improvement comprises a contrast filter being arranged behind the light valve unit and fluorescent plate in the direction of viewing, said contrast filter transmitting light of the excitation frequency range of the given range of wavelengths and absorbing the light of the frequency range emitted by the fluorescent particles, and a reflector being disposed behind the contrast filter so that light of the excitation frequency range of the given range of wavelengths passing through the light valve unit and the fluorescent plate is reflected by the reflector back into the plate.

In the case of the suggested display, the contrast filter will produce the required light or color contrast between the represented image and the image background. The reflector provided behind the filter assures that the brightness contrast is improved in the following manner. That part of the excitation light for the fluorescent particles of the fluorescent plate, which is not absorbed during the first entry into the fluorescent body or plate, will pass through the contrast filter which is transparent to the frequency range of the excitation light to the reflector, which reflects the light back into the fluorescent plate. The reflection thus lengthens the optical path length for the excitation light in the fluorescent body and thus raises the probability of absorption of the excitation light and thereby intensifies the usable fluorescent light. This intensification effect can be improved in individual cases so that certain fluorescent body parameters are also changed at the same time. If, perhaps, the amount of usable light is limited above all by means of a so-called "self-absorption", which is known to appear in the case of overlapping of the absorption band with the emission band, then a decreasing of the fluorescent material concentration and/or the thickness of the fluorescent plate or body in general will bring an additional gain when the excitation light is reflected back through the plate.

A FLAD type display, which has a fluorescent plate provided on a back surface with a filter and a reflective layer, is in itself disclosed in an older German patent application No. 27 59 339. However, in this device, the fluorescent body is provided with specific exit windows and thus does not have the optical contact between the light valve unit and the fluorescent medium or plate.

In the case of displays according to the present invention, the light valve unit need not absolutely lie in front of the fluorescent body or be embedded in the body. In fact, if the space relationships permit, it is many times more profitable to place the light valve unit behind the fluorescent body between the contrast filter and the fluorescent plate, which forms the light trap.

Independent of the relative position of the individual display parts to one another, it is always practical in the case of the proposed FLAD to design each reflector so that it is a diffusedly reflecting or scatters the light diffusedly. For a diffusing reflector can have an extremely high reflection factor. If one installs a diffused reflector also so that it is not in optical contact with the display part which it is next to, then the light is reflected in a preferred manner in the direction of the reflection normal and proceeds back upon the shortest path into the interior of the indicator device. In this regard, a copending United States patent application Ser. No. 014,536, which was filed on Feb. 23, 1979 and is based on German patent application No. P 28 08 440, discusses these features. Because of the superior characteristics, it is recommended also that the narrow edges or sides of the fluorescent plate or body as well as of the light valve unit be provided with diffusedly scattering or reflecting layers which do not have optical contact with the adjacent surfaces of the part.

If one wants to bundle or direct the light, which is emitted through the front of the device from the scattering areas of the light valve unit which usually emerges at a relatively large solid angle range to a certain direction, a suitable collector layer is placed in front of the indicating device. An example is a foil, which is applied without optical contact and which is provided with means for directing light. The foil with the means for directing may be a so-called lens foil or may be a foil which is provided with pyramid-shaped indentations or grooves having a triangular cross section.

Oftentimes, the relationship, such as the spectrum of the illuminating light, will contain frequencies which lie above the frequencies of the absorption band for the fluorescent material. In this case, the image brightness can be further increased if one constructs the proposed display in the following manner. The contrast filter is a high pass filter, that is, it permits in addition to the passage of the frequency for the excitation light also higher frequency radiation or spectrums to pass. The reflector is provided with means to displace or transform this high frequency radiation spectrum into the frequency range for the absorption band of the fluorescent particles before the light is reflected back into the plate. The means for changing or transforming the frequency can be fluorescent centers or particles which are provided in the reflecting layer.

BRIEF DESCRIPTION OF THE DRAWING

The FIGURE is a cross-sectional view of a display device in accordance with the present invention.

DESCRIPTION OF THE PREFERRED EMBODIMENT

The principles of the present invention are particularly useful in a display device 20, which is illustrated as a liquid crystal display device which could be used in a wristwatch. Details of the device 20, which are not necessary for understanding the invention, for example the mounting elements, electrical feed lines for the electrodes and perhaps additional illumination source have been omitted for the purpose of simplicity.

The device 20, when viewed from the direction of observation 21, is provided first with a foil 1, which has either a plurality of pyramid indentations or grooves having a triangular cross section, a fluorescent plate 2, a light valve unit 3, such as a liquid crystal cell, a contrast filter 4, and a reflector 5. The fluorescent plate 2, whose exact construction and manner of functioning is described in greater detail in the above mentioned U.S. Pat. No. 4,142,781 whose description is incorporated by reference thereto, is provided on its narrow edges or side with a diffusedly reflecting layer 6. All of these layers preferably have no optical contact with the fluorescent plate and thus find themselves at a finite distance from the edge or side of the plate. This condition can be easily obtained if the reflection layers are placed upon a base in each case.

A liquid crystal cell 3, which is directly adjacent the fluorescent plate contains an individual part of a front carrier plate 7 and a rear carrier plate 8, which are spaced apart by a frame 12 to form a cavity or chamber 13. The plate 7 on a surface facing the chamber 13 is provided with transparent conducting coatings, which are in segmented form to form transparent segment elements 9, and the rear carrier plate 8 is provided with a continuous back electrode 11 which is a transparent coating. A liquid crystal material is provided in the chamber 13 to form the liquid crystal layer. The edges of the cell 3 are covered with diffusing reflecting layers 14, which are also preferably provided without being in optical contact therewith. These layers provide that the fluorescent light from dead cell areas will be reflected back in a direction at which it can contribute to the brightness of the indicated display.

The contrast filter 4, which is located behind the cell 3, is constructed so that it is transparent for the excitation spectrum for the fluorescent particles on the one hand, but substantially blocks or absorbs most of the remaining frequencies of the visual light. One exception is that it may be a high pass filter, which would pass light of a higher frequency range than the frequency spectrum for the excitation light as mentioned hereinabove.

The reflector 5 is also diffusing reflector which will diffusedly scatter the light. The reflector 5 has no optical contact with the adjacent parts of the device.

For the individual parts of display, the various following materials may be used, for example. The carrier plates 7 and 8 of the cell consist of glass while the frame 12 is a glass solder and the electrodes 9 and 11 are tin oxide which is doped with antimony. The fluorescent plate 2 is preferably a polymethylmethacrylate with a fluorscein dissolved therein. The diffusedly reflecting layers such as 5, 6 and 14 are formed of titanium oxide and the contrast filter 4 is preferably a colored foil. The index of refraction of the glass carrier plates such as 7 and 8 is selected and matched to the index of refraction of the fluorescent plate so that the light at the common border surface experiences practically no total reflection.

The device 20 can be operated in the following manner. Light from the environment is caught by the foil 1, which has the pyramid indentations, and then is directed into the fluorescent plate. In the fluorescent plate 2, the fluorescent particles will absorb light of a given range of wavelength or of a specific frequency spectrum, which is called an excitation frequency range. The remaining portion of the light will pass through the plate and if the liquid crystal layer is not activated, pass through the liquid crystal cell to strike upon the contrast filter. The radiation of frequency ranges outside of the excitation light frequency spectrum are filtered out; however, the radiation which belongs to the excitation frequency range for the fluorescent material is passed to the reflector 5 where it is reflected back through the filter 4, the cell 3 and into the fluorescent plate 2. By reflecting the light of the excitation frequency range back into the plate 2, the chance of the light being absorbed by the fluorescent particles of the plate, is emitted as a fluorescent light, which is displaced indeed spatially isotropically and accordingly with a longer wavelength. The overwhelming majority of this fluorescent light is transmitted further by total reflection to the border surfaces and through the reflection of the diffusedly reflectors back into the interior of the plate. When the light escapes through the cell 3, it is then absorbed by the contrast filter 4. If the display is in an off condition, then the display will have a dark background or colired background indication. If one turns on or activates a specific area of the liquid crystal layer, then the rays which arrive in this area of the layer are scattered. A portion of this scattered light will finally reach the observer, who will perceive a light parallax-free image which is tinted in the fluorescent color in front of a nearly dark or colored background.

If one wants also to let the background appear colored, then the absorption characteristics of the contrast filter would have to be correspondingly altered. However, in all instances, the spectrum of the fluorescent light must be filtered out.

The larger the amount or portion of light, which is scattered out from the liquid crystal layer toward the front, the lighter the image generated in the display will be. If the energized area of the layer scatters without a privileged or set direction, a sufficient contrast will appear in general. The cell may be operated in a so-called "Heilmeier-Goldmacher" effect which is described in an article in the *Proceedings of IEEE*, Vol. 57, 1969, pp. 34–38. The cell may also be operated in a bistable effect which is described in an article in *Applied Physics Letter*, Vol. 25, 1974, pp. 5–7. Opposed to this type of operation, a so-called "dynamic scattering" comes less in the question because a dynamic scattering has a scattering characteristic with a distinctive maximum in transmission direction of the radiation entering the cell and, thereby only returns a little fluorescent light along the plate normals.

The invention is not limited to the illustrated embodiment. Thus, besides liquid crystal cells, other energizable mediums may be used, for example certain ferroelectric ceramics such as disclosed in an article in *Applied Physics Letter*, Vol. 20, 1972, pp. 169–171. Apart from this, also from the viewpoint of construction, there remains significant latitude in building the display. One could, for example, use the fluorescent plate at the same time as one of the two carrier plates or in case of the construction with a fluorescent plate in front of the light valve, one could design the rear carrier plate at the same time as a contrast filter.

Finally, let it be pointed out that the concept light valve unit as used in the present context has a far reaching meaning and encompasses all those energizable units which in cooperation with the fluorescent body or plate can produce an indicating device which can create an image of a certain color in front of a background of a different color which color is not necessarily black.

Although various minor modifications may be suggested by those versed in the art, it should be understood that we wish to embody within the scope of the patent granted hereon, all such modifications as reasonably and properly come within the scope of our contribution to the art.

We claim:

1. An indicating device having an electro-optical light valve unit whose front surface is in optical contact with a fluorescent plate, said plate consisting of a material with a refraction of index larger than 1 and containing fluorescent particles creating a fluorescent light which is emitted toward the front of the light value when excited by a given range of wavelengths of ambient light, said fluorescent plate being provided on its edges with means for reflecting light the improvement comprising a contrast filter being arranged behind the light valve unit and fluorescent plate in a direction of viewing, said contrast filter transmitting light of the given range of wavelengths and absorbing the light of the frequency range emitted by the fluorescent particles, and a reflector being disposed behind the contrast filter so that light of the given range of wavelengths passing through the light valve unit and the fluorescent plate is reflected by the reflector back into the plate.

2. In an indicating device according to claim 1, which includes a transparent foil disposed in front of the device, said foil directing light scattered by the light valve unit into a direction normal to the plane of the front surface of the device.

3. In an indicating device according to claim 2, wherein the foil is a lens foil.

4. In an indicating device according to claim 2, wherein the foil is spaced out of contact with any neighboring parts and is provided with pyramid-shaped indentations.

5. In an indicating device according to claim 1, wherein the reflector diffusedly reflects light and has no optical contact with the contrast filter.

6. In an indicating device according to claim 5, wherein the means for reflecting for the edges of the fluorescent plate are diffusedly reflective layers having no optical contact with the fluorescent plate.

7. In an indicating device according to claim 6, wherein the light valve unit has narrow sides provided with diffusedly reflecting reflective layers, said layers having no optical contact with the edges of the light valve unit.

8. In an indicating device according to claim 1, wherein the light passing from the fluorescent plate includes a frequency spectrum higher than the frequency of the given range of wavelengths, said contrast filter transmitting said light of said frequency spectrum and said reflector having means for converting the light of said frequency spectrum into the frequency of the given range of wavelengths before reflecting the light.

9. In an indicating device according to claim 8, wherein the means for converting includes fluorescent particles disposed in the reflector.

10. In an indicating device according to claim 1, wherein the light valve unit comprises a light crystal cell having a pair of carrier plates spaced apart to form a cavity for receiving a layer of liquid crystal material, each of the carrier plates on a surface facing the liquid crystal layer being provided with transparent electrical coatings, means for energizing said coatings so that the liquid crystal material is switched between a transparent state and a light scattering state.

11. In an indicating device according to claim 10, wherein the fluorescent plate forms the front carrier plate for the liquid crystal cell.

12. In an indicating device according to claim 10, wherein the liquid crystal cell is arranged behind the fluorescent plate in a direction of viewing and wherein the rear carrier plate of the liquid crystal cell serves as the contrast filter.

13. In an indicating device according to claim 10, which includes a transparent foil disposed in front of the fluorescent plate, said foil having means for directing light scattered forward by the liquid crystal cell into a direction extending normal to the plane of the plate.

14. In an indicating device according to claim 10, wherein the reflector diffusedly reflects light and is not in optical contact with the contrast filter.

15. In an indicating device according to claim 10, wherein the liquid crystal cell has diffusedly reflecting layers on the edges thereof, wherein the means for reflecting light on the edges of the fluorescent plate and the reflector are diffusedly reflecting layers, and each of said layers are not in optical contact with their respective part.

16. In an indicating device according to claim 10, wherein the light passing through the fluorescent plate and the liquid crystal cell includes a frequency spectrum higher than the frequency of the given range of wavelengths, said contrast filter transmitting said light of said frequency spectrum and said reflector having means for converting the light of said frequency spectrum into the frequency of the light of the given range of wavelengths before reflecting said light.

17. In an indicating device according to claim 10, wherein the means for selectively energizing the transparent electrical coatings energizes said coatings so that the liquid crystal layer operates in a so-called "bistability effect".

18. In an indicating device according to claim 10, wherein the means for energizing the transparent electrical coatings energizes said coatings so that the liquid crystal layer operates in a so-called "Heilmeier-Goldmacher" effect.

19. A method of operating an optical display device having a high contrast and light intensity of the image being displayed relative to the background light, said display device comprising a liquid crystal cell having a layer of liquid crystal material interposed between spaced apart front and rear transparent carrier plates, said carrier plates on their inner surfaces facing the layer of the liquid crystal material being provided with transparent conductive coatings to form electrodes with at least one of said coatings being interrupted to provide a plurality of separable, excitable electrodes and a fluorescent plate of material with an index of refraction greater than one, said material having fluorescent particles for creating fluorescent light from an excitation frequency of the ambient light, said plate being disposed in front of the liquid crystal cell in contact therewith, a contrast filter disposed behind the liquid crystal cell for absorbing light of the frequency range of the fluorescent light and passing light of the excitation frequency spectrum, a reflector disposed behind the filter for reflecting light of the excitation frequency back into the plate, said method comprising selectively applying an electrical voltage to the electrodes of the front and back plates to selectively change the optical properties of the liquid crystal layer disposed therebetween to create light images on the colored background of the filter.

20. A method according to claim 19, wherein the application of electrical potential creates a so-called bistability effect in the energized portions of the liquid crystal cell.

21. A method according to claim 19, wherein the application of an electrical potential to the selected electrodes creates a Heilmeier-Goldmacher effect in the energized portions of the liquid crystal layer.

* * * * *